United States Patent Office 2,803,687
Patented Aug. 20, 1957

2,803,687

1,3,5-ETHYLXYLENE RECOVERY

David A. McCaulay, Chicago, Ill., and Arthur P. Lien, Highland, Ind., assignors to Standard Oil Company, Chicago, Ill., a corporation of Indiana No Drawing. Original application August 26, 1954, Serial No. 452,445. Divided and this application February 7, 1956, Serial No. 563,860

2 Claims. (Cl. 260—674)

This invention relates to the recovery of 1,3,5-ethylxylene from admixture with diethylbenzene.

This application is a division of our copending application Serial No. 452,445, filed August 26, 1954.

A demand exists for styrene-type resins which have softening points above that of polystyrene and also crosslinking polystyrene-type resins. Triethylbenzene and diethyltoluene are suitable sources of these types of materials if the isomers charged to the dehydrogenation process contain no ortho positioned groups. Essentially pure, i. e., within the error of infrared spectrometry, which is about 2%, 1,3,5-triethylbenzene and 1,3,5-diethyltoluene are excellent starting materials for the production of high softening point resins having cross-linkages.

1,3,5-ethylxylene (1-ethyl-3,5-dimethylbenzene) is of interest in the production of high melting point styrene-type resins. Essentially pure material is necessary since the presence of any of the other isomers of ethylxylene results in a marked decrease in the softening point obtainable.

The process permits the separation of the close boiling mixture of isomers of diethylbenzene and ethylxylene. These isomers boil so close together that they are not separable by even superfractional distillation. However, 1,3,5-triethylbenzene is very easily separated by distillation from 1,3,5-ethylxylene. In the HF—$BF_3$ treating of a mixture of xylene and ethylbenzene to separate meta-xylene away from the ortho and para-xylenes, there is produced a $C_{10}$ aromatic hydrocarbon fraction consisting essentially of 1,3-diethylbenzene and 1,3,5-ethylxylene. By utilizing 1 mole of ethylene per mole of diethylbenzene in the mixture of diethylbenzene and ethylxylene, it is possible to convert the diethylbenzene to triethylbenzene almost completely, thereby permitting the distillative recovery of a $C_{10}$ aromatic fraction containing 95% or more of 1,3,5-ethylxylene. By using a slight excess of not more than 1.1 moles in all of ethylene per mole of diethylbenzene, it is possible to remove the diethylbenzene so completely that 1,3,5-ethylxylene of 99+% purity is separable by distillation from the reaction product mixture. The reaction product mixture will contain, in addition to the triethylbenzene, some tetraethylbenzene and diethylxylene. Therefore, the amount of ethylene charged should be controlled to attain the desired purity without wastage of ethylxylene.

The olefin used in the process is ethylene. Although inert diluent gases may be present, it is preferred to operate with commercial purity ethylene or pure ethylene. The process is carried out in the presence of liquid HF and $BF_3$. In order to avoid hydrate formation and reduce corrosion, the process is carried out under substantially anhydrous conditions. The liquid hydrogen fluoride should not contain more than about 3% of water. Commercial grade anhydrous hydrofluoric acid is suitable for use in the process.

Enough liquid HF must be present in the alkylation zone to participate in the formation of an HF and $BF_3$ complex with the polyalkylbenzene charged. It is believed that 1 mole of HF is present in each mole of HF—$BF_3$ polyalkylbenzene complex. In addition to this amount, it is necessary to have sufficient liquid HF to dissolve the complex formed. In general, enough liquid HF must be present to form a distinct separate acid phase. More than this amount is desirable and usually at least about 3 moles of liquid HF are used per mole of aromatic hydrocarbon in the feed. More than this amount may be used, for example 50 moles or more. It is preferred to operate with between about 6 and about 12 moles of liquid HF per mole of aromatic hydrocarbon in the feed.

The temperature and the time are related in this process. In order to obtain the maximum yield of 1,3,5-triethylbenzene, it is not only necessary to operate for a defined time at each particular temperature of operation, but it is necessary to control the rate of ethylene addition. The maximum temperature of operation is determined by cracking reactions and tar formation; this maximum temperature is about 175° C. In order to avoid these undesired side reactions, the practical temperature of operation is about 135° C. At these high temperatures, the necessary time is quite short and may be on the order of 1 to 2 minutes. The process is operable at quite low temperatures provided that a sufficiently long time is utilized. Thus, at 0° C. it may be necessary to maintain the contents of the alkylation zone for several weeks in order to obtain the maximum conversion to the 1,3,5-triethylbenzene. The time and temperature relationship is illustrated as follows: At 20° C., the necessary time is about 3 days, i. e., 70 to 80 hours; 60° C.—about 30 minutes; 80° C.—about 10 minutes. It is to be understood that at temperatures below about 100° C. the process may be carried on for times longer than those set out above without significant harmful effects, but also without any appreciable beneficial effects. It is preferred to operate at a temperature between about 50° C. and about 80° C. for a time between about 10 minutes and 2 hours, the longer times corresponding to the lower temperatures.

The process involves not only addition of the ethylene to the aromatic hydrocarbon, but also it is believed isomerization of the original alkylate to the 1,3,5-configuration which appears to be the most stable configuration in the presence of HF—$BF_3$ agent. In order to attain a triethylbenzene which is essentially pure 1,3,5-triethylbenzene, it is necessary to add the ethylene to the alkylation zone at a substantially constant rate over the time needed, corresponding to the particular temperature. Put in another way, the ethylene is added at about a uniform rate over the particular time. It is preferred to add the ethylene in such a way that all of the ethylene will have been added shortly before the end of the time corresponding to the particular temperature. This addition is at a constant amount per unit time.

The alkylate product contains triethylbenzene alkylate produced in the ethylation reaction, which triethylbenzene alkylate is essentially pure 1,3,5-isomer. The term "essentially pure" is used herein as within the accuracy of infrared spectrometry which is about 2% absolute. It is believed that operating under the described conditions, the triethylbenzene alkylate is 99+% 1,3,5-isomer.

The results obtainable with the process of the invention are set out in Example I below. For purposes of comparison, Example II is set out showing the alkylation of 1,3,5-ethylxylene in the absence of diethylbenzene.

The examples were carried out using a reactor provided with a stirrer. The hydrocarbon feed was added to the reactor followed by the addition of commercial grade anhydrous hydrofluoric acid containing about 1% of water. The $BF_3$ was then pressured into the reactor;

commercial grade cylinder BF₃ was used. Commercial grade cylinder ethylene was introduced into the reactor at a uniform rate over the total time of contacting carried on in the reactor. After all the ethylene had been added, the agitation was continued for a moment or two and then the contents of the reactor were withdrawn into a vessel filled with crushed ice. The upper hydrocarbon layer was decanted from the lower aqueous layer which formed in the vessel. After having been neutralized and washed, the hydrocarbons recovered were fractionated in a column providing about 30 theoretical plates. The close boiling product fractions from this column were analyzed by a combination of boiling point, specific gravity, refractive index, and ultraviolet and infrared spectrometry.

EXAMPLE I

In this example, Eastman diethylbenzene, consisting of a mixture of the meta and para isomers, was charged to the reactor along with 1,3,5-ethylxylene. Infrared analysis indicated that this ethylxylene was 99%+ the 1,3,5-isomer. Equimolar amounts of diethylbenzene and ethylxylene, namely 0.64 mole, respectively, was charged. Approximately 9 moles of liquid HF were charged followed by 1.52 moles of BF₃. The material in the reactor was agitated while 0.64 mole of ethylene was added over a 30 minute period. The temperature of the materials in the reactor during this time was about 30° C. The hydrocarbons recovered from the quenching with crushed ice represented 94% of those charged.

The product distribution set out in the table shows that within the error of the procedure, all of the 1,3,5-ethylxylene charged was recovered without change from the total hydrocarbon product. A small amount of ethylbenzene was recovered as well as some material higher boiling than triethylbenzene. This material appears to be a mixture of tetraethylbenzene and pentaethylbenzene. Within the error of infrared spectrometry, the ethylxylene recovered from the product hydrocarbons contained only the 1,3,5-isomer and the triethylbenzene recovered from the product hydrocarbons contained only the 1,3,5-isomer.

EXAMPLE II

In this test, 1,3,5-ethylxylene of the same composition as that charged to Example I was introduced into the reactor in an amount of 0.50 mole. Four moles of liquid HF and 0.50 mole of BF₃ were then introduced into the reactor. The contents of the reactor were stirred while 0.50 mole of ethylene was added over a period of 15 minutes. The temperature of the reactor contents during this time was 25° C.

Analysis of the total hydrocarbon product recovered showed that about 60 mole percent of the 1,3,5-ethylxylene had been ethylated to diethylxylene, triethylxylene and tetraethylxylene. This is in striking contrast with the results in Example I wherein the diethylbenzene was precisely ethylated away from the 1,3,5-ethylxylene without measurable losses of 1,3,5-ethylxylene to higher polyethylxylenes.

The detailed breakdown of the conditions of the two examples and the product distribution are set out in the annexed table which forms a part of this specification.

Table

| Example | I | | II | |
|---|---|---|---|---|
| | Moles | Percent | Moles | Percent |
| Feed: | | | | |
| Diethylbenzene¹ | 0.64 | 50 | None | 0 |
| 1,3,5-Ethylxylene | 0.64 | 50 | 0.50 | 100 |
| Ethylene | 0.64 | | 0.50 | |
| HF, moles/mole of feed | 9 | | 7.5 | |
| BF₃, moles/mole of feed | 1.18 | | 1.0 | |
| Temperature, °C | 30 | | 25 | |
| Contacting Time, Minutes | 30 | | 15 | |
| Hydrocarbon recovery, Wt. Percent | 94 | | | |
| Hydrocarbon Product Distribution, Mole Percent: | | | | |
| Ethylbenzene | 2 | | | |
| Diethylbenzene | None | | | |
| 1,3,5-Ethylxylene² | 50 | | ²40 | |
| 1,3,5-Triethylbenzene² | 43 | | | |
| Tetra and higher ethylbenzenes | 5 | | | |
| Diethylxylene | | | 41 | |
| Triethylxylene | | | 13 | |
| Tetraethylxylene | | | 6 | |

¹Mixture of meta and para isomers.
² Pure 1,3,5-isomer (infrared).

Thus having described the invention what is claimed is:

1. A separation process which comprises (1) under substantially anhydrous conditions adding ethylene to a feed consisting essentially of diethylbenzene and 1,3,5-ethylxylene, in a mol ratio of ethylene to diethylbenzene of between 1 and 1.1, in the presence of liquid HF, in an amount of between about 3 and 50 moles, and BF₃ in an amount of at least 1 mole, respectively, per mole of feed, at a temperature between about 20° C. and 175° C. for a time between about 2 minutes and 3 days, the longer times corresponding to the lower temperatures, said ethylene being added about uniformly over said time, (2) removing HF and BF₃ from a hydrocarbon reaction product mixture, and (3) distillatively obtaining from said mixture a C₁₀ aromatic hydrocarbon fraction consisting essentially of 1,3,5-ethylxylene.

2. A separation process which comprises (1) under substantially anhydrous conditions adding ethylene to a feed consisting essentially of diethylbenzene and 1,3,5-ethylxylene, in a mol ratio of ethylene to diethylbenzene of between 1 and 1.1, in the presence of liquid HF, in an amount of between about 6 and 12 moles, and BF₃ in an amount of at least 1 mole, respectively, per mole of feed, at a temperature between about 50° C. and 80° C. for a time between about 10 minutes and 2 hours, the longer times corresponding to the lower temperatures, said ethylene being added about uniformly over said time, (2) removing HF and BF₃ from a hydrocarbon reaction product mixture, and (3) distillatively obtaining from said mixture a C₁₀ aromatic hydrocarbon fraction consisting essentially of 1,3,5-ethylxylene.

No references cited.